J. B. SWEETLAND.
Churn Power.
No. 41,107.
Patented Jan. 5, 1864.
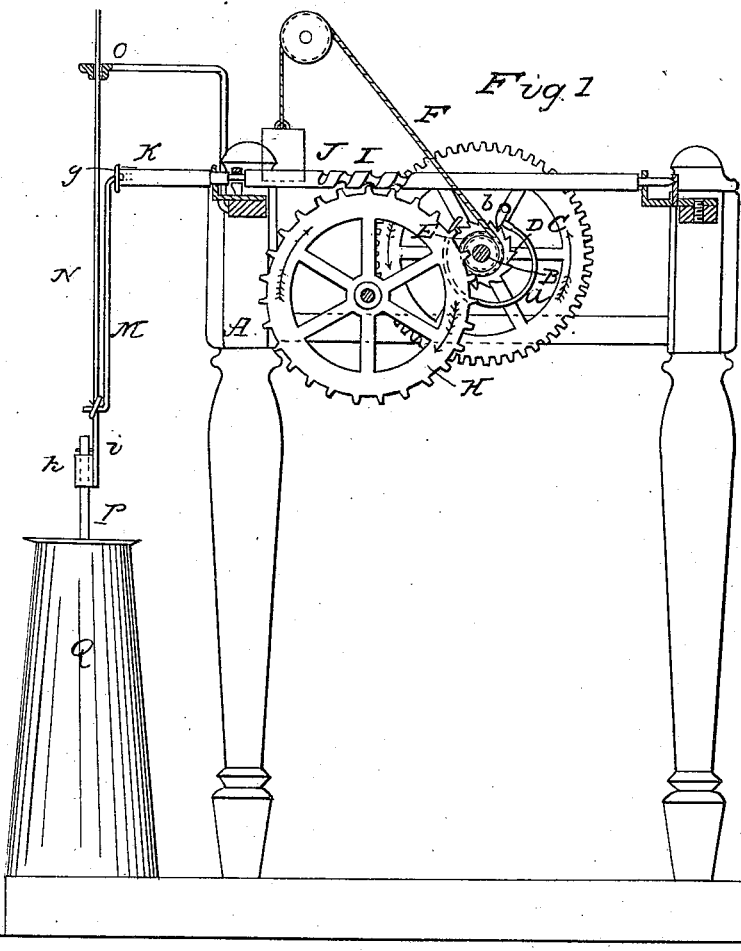
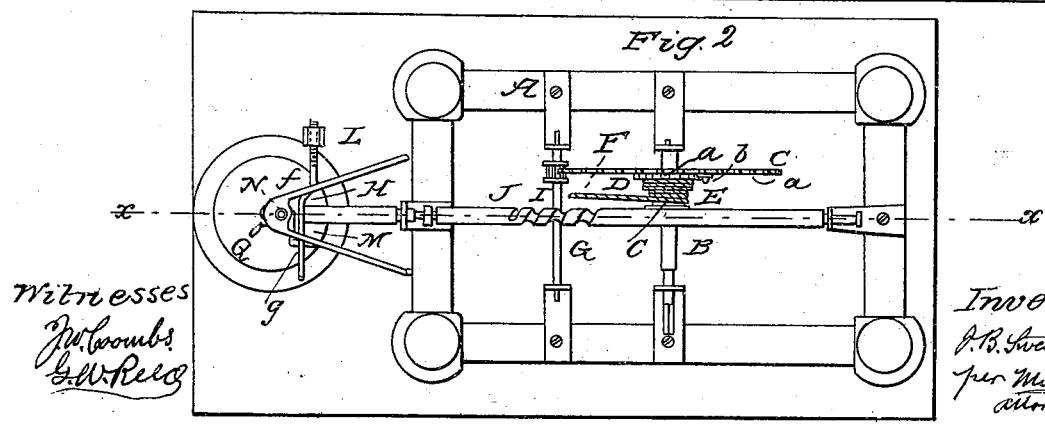

UNITED STATES PATENT OFFICE.

J. B. SWEETLAND, OF FOSTORIA, OHIO.

IMPROVEMENT IN CHURN-POWERS.

Specification forming part of Letters Patent No. 41,107, dated January 5, 1864.

*To all whom it may concern:*

Be it known that I, JEROME B. SWEETLAND, of Fostoria, in the county of Seneca and State of Ohio, have invented a new and Improved Churn-Power; and I do hereby declare that the following is a full, clear, and exact description of the same, reference being had to the accompanying drawings, making a part of this specification, in which—

Figure 1 is a side setional elevation of my invention, taken in the line $x\ x$, Fig. 2. Fig. 2 is a plan or top view of the same.

Similar letters of reference indicate corresponding parts in the two figures.

To enable those skilled in the art to fully understand and construct my invention, I will proceed to describe it.

A represents a framing, which may be constructed in any proper way, to support the working parts, and B represents a shaft, which is placed transversely on the framing A, and has a toothed wheel, C, attached permanently to it, to which a spring, $a$, is attached, said spring bearing against a pawl, $b$, which engages with a ratchet, D, the latter being secured to one end of a drum, E, which is placed loosely on the shaft B.

The drum E is not of equal diameter throughout, one part, $c$, being smaller in diameter than the other part, $d$, as shown clearly in Fig. 2. To the large part $d$ of this drum E a rope, F, is attached, said rope being wound upon both the large and small part of the drum, as shown in red in Fig. 2. This rope has a weight attached to its free or disengaged end.

The wheel C gears into a pinion, $e$, on a shaft, G, in the framing A, and on said shaft there is also secured a toothed wheel, H, which gears into a screw, I, on a shaft, J, the latter being placed longitudinally on the framing A, and extending at one end beyond the framing A, and having a balanced-crank, K, attached to it.

The crank K is balanced by means of a weight, L, which is fitted on an arm, $f$, of the crank, said arm having a screw-thread cut on it on which the weight L is fitted like a nut, so as to admit of the weight being screwed further in or out on the arm $f$, as occasion may require. The other arm, $g$, of the crank is in line with the arm $f$, and it is perforated with holes, into any one of which the upper end of a connecting-rod, M, is fitted. The lower end of this connecting-rod is attached to a vertical slide-rod, N, the upper part of which is fitted in a bearing, O, the lower end of the slide-rod having a tube, $h$, attached, in which the rod P of the churn-dasher is fitted and secured by a pin, $i$.

The length of the stroke of the dasher is regulated by connecting the upper end of the rod M at a greater or less distance from the end of the arm $g$, and the weight of the dasher is balanced by the weight L on the arm $f$ of the crank K, said weight being adjusted farther in or out on the arm $f$, as may be required to balance the dasher. The churn Q may be of the ordinary form.

The direction of the movement of the wheels is indicated by the arrows in Fig. 1. By this arrangement a very compact and convenient churn-power is obtained. The balanced crank greatly facilltates the operation.

The power of the weight, which is the motor, is rendered variable in consequence of the two different diameters of the drum E, the rope F first unwinding from the small part $c$ of the drum, and then from the large part $d$, the power of the weight increasing when the rope unwinds from $d$, which occurs when the butter begins to form, and additional power is consequently required to operate the dasher. The drum E, it will be seen, is connected with the wheel C by means of the pawl $b$ and ratchet D, and the weight is wound up by turning the shaft B through the medium of a proper key.

The framing A and churn may be secured to the floor by any proper means.

I do not claim, broadly, the use of weights and wheels to drive churns, nor do I claim the invention of variable drums; but,

Having thus described my invention, what I claim as new, and desire to secure by Letters Patent, is—

The arrangement of the variable drum E, gearing C $e$ H, crank K, adjusting-balance L, and rods M N, with the dasher-rod P, in the manner herein shown and described, and for the purpose specified.

J. B. SWEETLAND.

Witnesses:
JOSH W. BIRD,
H. N. SMITH.